United States Patent Office 3,160,676
Patented Dec. 8, 1964

3,160,676
THERMOSET COMPOSITIONS BASED ON VINYL PYRROLIDONE CONTAINING CARBOXY POLYMERS-POLYEPOXIDE COMPOSITIONS
David W. Mabrey, Middletown, and William P. Altmiller, Lyndon, Ky., assignors, by mesne assignments, to Devoe & Raynolds Company, Inc., a corporation of Delaware
No Drawing. Filed May 7, 1959, Ser. No. 811,533
5 Claims. (Cl. 260—834)

This invention relates to new coating compositions and to their preparation. More particularly, it relates to thermoset compositions based on carboxy polymers and epoxide resins, carboxy polymers being made from short chain alpha, beta unsaturated monocarboxylic acids and ethylenically unsaturated monomers polymerizable therewith.

Carboxy copolymer-polyepoxide systems have been known for several years, as shown by U.S. Patent 2,604,464. Although they are quite desirable coating compositions because of their properties, these compositions have nevertheless achieved only limited commercial success, the reason being that in the curing of the films a catalyst must be employed. Catalytic systems are of limited commercial value because they are unstable and hence cannot be displayed and stored. In addition films of these particular compositions when cured at high temperatures are unsatisfactory even when a catalyst is used.

It has now been found that if N-vinyl pyrrolidone is employed as one of the monomers in the preparation of the carboxy polymer, very satisfactory films are obtained in less than a half an hour at high baking temperatures, say above 380° F. In addition in accordance with another embodiment of this invention stable carboxy-polymer polyepoxide film compositions are provided which can be cured at elevated temperatures below 380° F. In this embodiment it has now been found that if an alkylated urea, melamine or similar aldehyde condensate is used with the N-vinyl pyrrolidone modified copolymer and a polyepoxide a stable film forming composition results, and films are produced at temperatures below 380° F. having outstanding properties. Many compounds such as vinyl pyridine have been tried as replacements for the amine or quaternary ammonium catalysts in an effort to eliminate the catalyst. Nevertheless none of these resulted in a rapidly curing, completely stable, coating composition.

The carboxylic acids polymerized with the N-vinyl pyrrolidone and other polymerizable ethylenically unsaturated monomer to form the carboxy polymer are acrylic acid, methacrylic acid, or crotonic acid, i.e. alpha-beta unsaturated monocarboxylic acids having a single double bond and not more than four carbon atoms. By N-vinyl pyrrolidone is meant the nitrogen-substituted alpha or the beta butyrolactam, i.e. either

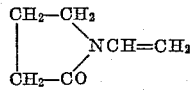

or

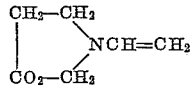

Copolymerized with the alpha-beta unsaturated acids and N-vinyl pyrrolidone are ethylenically unsaturated monomers copolymerizable therewith containing a single double bond, i.e. single vinyl, vinylene or vinylidine group. Particularly important are vinyl aromatic compounds, for instance, styrene, vinyl toluene, and other ethylenically unsaturated monomers such as alpha-methyl styrene, the halo-styrenes, etc. having a single vinyl group and free of other substituents capable of reacting with an unsaturated acid. Also valuable are saturated alcohol esters of acrylic, methacrylic and crotonic acids. Examples of vinyl aromatic monomers are isopropenyl toluene, the various dialkyl styrenes, ortho-, meta-, and para-chloro styrenes, bromo styrenes, fluoro styrenes, cyano styrenes, vinyl naphthalene. Other monomers are the various alpha-substituted styrenes, e.g., alpha-methyl styrenes, alpha-methyl para-methyl styrenes, as well as various di-, tri-, and tetra-chloro, bromo, and fluoro styrenes. Acrylic, methacrylic, and crotonic esters of saturated alcohols include the methyl, ethyl, propyl, isoproyl, n-butyl, isobutyl, (sec)butyl, (tert)butyl, amyl, hexyl, heptyl, octyl, decyl, dodecyl, etc. esters of acrylic, methacrylic and crotonic acids. Thus, preferred monomers include alpha-beta unsaturated monocarboxylic acid esters of saturated monohydric alcohols, the acids having not more than 4 carbon atoms and the alcohols having not more than 20 carbon atoms and monovinyl aromatic compounds.

Other known monomers which can be used in the preparation of the carboxy-polymer include vinyl aliphatic cyanides of not more than four carbon atoms, for example, acrylonitrile and methacrylonitrile. Also included are monovinyl ethers, e.g., ethyl vinyl ether, ethyl methallyl ether, vinyl butyl ether, methyl vinyl ether and others of not over 20 carbon atoms. Unsaturated monohydric alcohol esters of saturated monobasic acids are also intended wherein the alcohols contain a single double bond and the acids have not more than 20 carbon atoms, for instance, vinyl acetate, vinyl stearate, and the allyl, methallyl and crotyl esters of propionic, butyric and other acids and, of course, not only the monomers themselves, but mixtures of the monomers can be copolymerized with the alpha-beta unsaturated acids to form the carboxy polymer. However, when mixtures are employed a certain degree of selectivity must be exercised, since there will be certain combinations of monomer and crotonic acid which are undesirable. A desirable polymer includes a solution of 33 percent styrene, 33 percent methyl methacrylate, 20 percent butyl acrylate, 10 percent methacrylic acid and 4 percent N-vinyl-2-pyrrolidone. In general the copolymer contains 5 to 25 percent alpha-beta unsaturated acid and 1 to 20 percent preferably 1 to 5 percent vinyl pyrrolidone, the remainder being the monoethylenically unsaturated monomer.

Since carboxy polymers are well known their preparation need not be discussed at length herein. Polymerization is effected by conventional solution polymerization techniques using a thermally or ultra violet decomposable free radical polymerization catalyst such as peroxide and unsymmetrical azo compounds, such as azo bis-isobutyronitrile, benzoyl peroxide, ditertiary butyl peroxide, or a hydroperoxide such as cumene and a temperature of 15° C. to 170° C. Suitable solvents are the known polar solvents, for example diisobutyl ketone, methyl isobutyl ketone, hydroxy ethyl acetate, 2-ethoxyethyl acetate, propylene glycol methyl ether, diethyl ether of ethylene glycol, propylene glycol methyl ether, butyl alcohol and isopropyl alcohol. In other words, the solvents are ethers, esters, ketones or alcohols, or mixtures of these with aromatic hydrocarbons such as xylene, the ethers, esters, ketones and alcohols having boiling points of 55° C. to 200° C., generally 120° C. to 160° C.

Alkylated urea-aldehyde condensates can be made by various processes known in the art for the manufacture of urea-formaldehyde resins. Similarly the alkylated melamine-aldehyde condensates of different states of condensation, so long as they are soluble, can be used with the copolymer to form the new compositions. The alkylated condensates of aldehydes with organic ammonia derivatives result when the condensates are prepared in the presence of alcohols and the like, these solvents actually becoming part of the resulting product. This is illustrated by the products prepared in the presence of butyl and other alcohols wherein the condensation reactions take place through alcohol ether groups rather than methylol groups as is the case with non-alkylated urea aldehyde resins.

Since the alkylated urea- or melamine-aldehyde condensates can be at different stages of conversion when used with the carboxy polymer, compositions of somewhat different characteristics can be obtained with products of different stages of conversion. Similarly different aldehyde condensates may vary in their reactivity in the presence of various carboxy polymers. Moreover, when the reactants are combined it may be that reactions of certain combinations of reacting materials take place at a more rapid rate than others. But in any event the reaction products, when made of proper proportions of reactants, form valuable reaction products.

It is understood that various amines and amides will condense with aldehydes to form alkylated aldehyde-amine and aldehyde-amide condensates. Thus, urea, thiourea, and various substituted ureas and urea derivatives will react with aldehydes such as formaldehyde to form condensates, e.g., methylol ureas, etc. Similarly, it is well known that melamine, for instance, melamine itself and substituted melamines such as benzoguanamine, will react with aldehydes, particularly formaldehyde, in the presence of alcohols to form the alkylated melamine-aldehyde condensates. Various other amines and amides can similarly be reacted with formaldehyde, etc. to form condensates. Thus, other amino-triazines and amino-diazines will react with aldehydes to form condensates. Many of the present day commercial resins are prepared in the presence of alcoholic solvents which actually take part in the reaction. These known aldehyde condensates with ammonia derivatives are used for reacting with carboxy polymers and polyepoxides according to this invention.

Among the polyepoxides which are used in admixture with the polymer and aldehyde condensate are glycidyl polyethers of polyhydric alcohols and polyhydric phenols prepared by reacting the alcohol or phenol with a halohydrin such as epichlorhydrin in the presence of an alkali. These are well-known epoxide resins described in such patents as U.S. 2,467,171, U.S. 2,538,072, U.S. 2,582,985, U.S. 2,615,007, U.S. 2,698,315, U.S. 2,581,464. In addition to epoxy (i.e. oxirane), ethers, epoxy esters are included. Desirable epoxy esters can be made by the epoxidation of unsaturated esters by reaction with a peracid such as peracetic acid or performic acid, a desirable ester thus prepared being, 3,4-epoxy-6-methylcyclohexylmethyl-3-4-epoxy-6-methylcyclohexanecarboxylate.

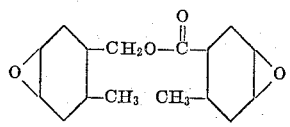

Other epoxy compounds included are for example the diglycidyl ether of trimethylol propane, dicyclopentadiene diepoxide, and bis-epoxy-dicyclopentyl ether of ethylene glycol.

In the preparation of the film forming compositions of the invention it is best to bring together and mix the non-aqueous solutions of the polymer, the polyepoxide, and the aldehyde condensate. The three components are mixed in amounts of 0.7 to 2 equivalents polyepoxides per carboxy equivalent of polymer, plus 5 to 40 percent aldehyde condensate resin based on the entire non-volatile composition (excluding solvent). By one equivalent of a polyepoxide is meant the weight in grams of polyepoxide providing one epoxide (oxirane) group, whereas one carboxyl equivalent is the weight in grams of copolymer providing one carboxy group. The combined polymer-epoxide-aldehyde condensate composition, excluding solvent, is 5 to 40 and preferably 5 to 25 percent aldehyde condensate. It is to be understood, however, that the amount of aldehyde condensate employed will vary somewhat with the composition of the carboxy polymer. With more plasticizing type of monomers, more aldehyde condensate resin is preferred.

When the aldehyde condensate, the carboxy polymer and the polyepoxide are combined, films prepared therefrom are heated to bring about a reaction between the reactants. Whereas a temperature of over 360° F. is required to cure the films in the absence of the aldehyde condensate, the film forming compositions are heated at 300° F. to 360° F. when the aldehyde condensate is used.

The invention will now be illustrated in greater detail by means of the following specific examples in which the preparations of typical carboxy polymers and of some of the films are described. It should be understood that the invention is not to be limited to these particular examples or to the particular proportions of reactants employed since the examples are illustrative only and are not intended to limit the invention. The polyepoxides used in the following examples were prepared by the condensation of various proportions of epichlorhydrin to bisphenol and subsequent dehydrohalogenation with sodium hydroxide. The table which follows indicates the ratio of epichlorhydrin to bisphenol used to prepare the polyepoxides, and in the examples the polyepoxides will be referred to by their epoxide equivalents. Thus an epoxide having an epoxide equivalent of 190 will be termed "Epoxide 190."

| Polyepoxide | Mol Ratio | | Epoxide Equivalent |
|---|---|---|---|
| | Epichlorhydrin | Bisphenol | |
| Epoxide 190 | 10 | 1 | 190 |
| Epoxide 590 | 1.4 | 1 | 590 |
| Epoxide 947 | 5 | 4 | 947 |
| Epoxide 1710 | 100 parts of Epoxide 947 plus 5 parts of Bisphenol | | 1,710 |
| Epoxide 250 | 2.6 | 1 | 250 |
| Epoxide 495 | 1.57 | 1 | 495 |

The aldehyde condensates employed in the examples are all obtainable commercially. The urea-aldehyde resin employed is an isobutylated urea-formaldehyde resin having the following properties: Gardner-Holdt viscosity, S–V; non-volatiles 60 percent in 87.5 percent isobutyl alcohol and 12.5 percent xylene; and a naphtha tolerance of 350. The triazine resin of Example 2 is a butylated benzoguanamine formaldehyde condensate having; a Gardner-Holdt viscosity of G to K; 60 percent non-volatiles in 50 percent butyl alcohol, 50 percent xylene: acid value of 0 to 1; weight per gal. 8.7; and a naphtha tolerance of 175 minimum. The melamine aldehyde condensate of Example 6 is water solution of a water-soluble methylated melamine formaldehyde condensate having a Gardner-Holdt viscosity of X to Y at 80 percent non-volatile, a Gardner color less than 1 and a pH of 8.7 to 9.

EXAMPLE 1

| Material | Portion I | | Portion II | |
|---|---|---|---|---|
| | Weight Percent | Parts by Weight | Weight Percent | Parts by Weight |
| Styrene | 6.6 | 132 | 26.4 | 528 |
| Methyl Methacrylate | 6.6 | 132 | 26.4 | 528 |
| Butyl Acrylate | 4.0 | 80 | 16.0 | 320 |
| Methacrylic Acid | 2.0 | 40 | 8.0 | 160 |
| N-Vinyl-2-Pyrrolidone | .8 | 16 | 3.2 | 64 |
| Cumene Hydroperoxide | | 30 | | 40 |
| Xylene | | 1,500 | | 40 |

Into a three liter, three-necked, round-bottomed flask equipped with a thermometer, agitator, dropping funnel, and reflux condenser is charged Portion I. This monomer-catalyst solution is heated to reflux (280° F.) at which temperature Portion II, which is prepared by combining the styrene, methyl methacrylate, butyl acrylate, methacrylic acid, and N-vinyl-2-pyrrolidone and cumene hydroperoxide in the amounts listed above, is slowly introduced into the flask by means of a dropping funnel over a period of one and one-half hours. The reaction mixture is held at constant reflux (280° C.–285° C.) until the percent conversion is 99 percent at which time the heating is discontinued. The resulting copolymer solution is adjusted to 50 percent N.V. in 81.8 percent xylene, and 18.2 percent butanol, the resulting solution of this copolymer having a Gardner-Holdt viscosity of approximately Y to Z, an acid value of approximately 64.4, and a color of 1 (Gardner Scale). From a film forming solution prepared by blending 156 parts by weight of this copolymer solution (50 percent N.V.), 17 parts by weight of Epoxide 190, and 9.09 parts by weight of an isobutylated urea-formaldehyde resin solution (55 percent N.V.), films having a wet thickness of 1.5 mils are drawn down on 1000 Bonderite panels (steel panels phosphatized with Bonderite 1000 (iron phosphate)). The films are cured at 360° F. and 300° F. Properties of these films are given in Table I. Similar films are prepared using Epoxides 250, 475, and 590 instead of Epoxide 190 in the film forming solution.

EXAMPLE 2

In accordance with Example 1, a film forming solution is made from 156 parts by weight of the copolymer solution of Example 1 (50 percent N.V.), 17 parts by weight of Epoxide 475, 8.33 parts by weight of a triazine formaldehyde resin solution (60 percent N.V. in a 20/20 xylol/butanol mixture) and films prepared. Similar films are prepared using Epoxide 590 instead of Epoxide 475 in the film forming solution.

EXAMPLE 3

Following the procedure for the preparation of the copolymer of Example 1, a carboxy copolymer solution is prepared without vinyl pyrrolidone as follows:

| Material | Portion I | | Portion II | |
|---|---|---|---|---|
| | Weight Percent | Parts by Weight | Weight Percent | Parts by Weight |
| Styrene | 6.91 | 138 | 27.63 | 553 |
| Methyl Methacrylate | 6.91 | 138 | 27.63 | 553 |
| Butyl Acrylate | 4.18 | 84 | 16.74 | 335 |
| Methacrylic Acid | 2.00 | 40 | 8.00 | 160 |
| Cumene Hydroperoxide | | 30 | | 40 |
| Xylene | | 1,540 | | |

The resulting copolymer solution is adjusted to a 50 percent N.V. in 81.8 percent xylene, and 18.2 percent butanol resulting in a solution of the copolymer having a viscosity of $Z_3$ (Gardner-Holdt), an acid value of 65 and a color of less than one (Gardner Scale). From a film forming solution of 156 parts of this copolymer solution (50 percent N.V.), 17 parts by weight of Epoxide 190, and 9.09 parts by weight of an isobutylated urea-formaldehyde resin solution (55 percent N.V.), 1.5 mil films (wet thickness) are drawn down on iron phosphate coated panels. The films, cured at 360° F. and 300° F. for thirty minutes, possess properties shown in Table I. In addition a similar film is prepared without the isobutylated urea-formaldehyde resin, the film morming solution being a liquid mixture of copolymer solution and Epoxide 190.

EXAMPLE 4

Following Example 3, film forming solutions are prepared by adding one and two percent benzyl trimethyl ammonium chloride to the copolymer-epoxide composition which contained no isobutylated urea-formaldehyde resin solution. The properties of films from these film-forming solutions are compared with those of Examples 1 and 3 in Table I.

*Table I*

| Film Forming Composition (Blend of reactants) | Film Curing Temp., ° F. at 30 min. | Stain [1] Resistance, 48 Hrs. | Grease [2] (Pencil Hardness) | Mandrel | Detergent [3] (141 Hrs. in 1 percent Tide at 160° F.) |
|---|---|---|---|---|---|
| Composition of Ex. 1 wherein Copolymer contains VP, Blend contains UF, Blend contains no catalyst. | 300 / 360 | Pass / do | Did not soften / do | Pass / do | 8 / 8 |
| Composition of Ex. 4 wherein Copolymer contains no VP, Blend contains no UF, Blend contains catalyst (1 percent BTMACL). | 300 / 360 | Pass / do | Did not soften / do | Pass / do | 6 / 8 |
| Composition of Ex. 4 wherein Copolymer contains no VP, Blend contains no UF, Blend contains catalyst (2 percent BTMACL). | 300 / 360 | Pass / do | Did not soften / do | Pass / do | 5 / 5 |
| Composition of Ex. 3 wherein Copolymer contains no VP, Blend contains no UF, Blend contains no catalyst. | 300 / 360 | Pass / do | H to F in 11 days / 4H to 3H in 11 days | Failed / do | 4 / 5 |

[1] Lipstick, Orange Dye, Clorox, 5 percent NaOH, Vinegar, Mustard.
[2] One month immersion at room temperature in 50/50 oleic acid/cottonseed oil mixture.
[3] 10 = Excellent. 0 = Failure.
VP = N-vinyl-2 pyrrolidone.
UF = Isobutylated urea-formaldehyde resin.
BTMACL = Benzyl trimethyl ammonium chloride.

EXAMPLE 5

Following the procedure for the preparation of the copolymer of Example 1, a carboxy copolymer solution is prepared from the following:

| Material | Portion I | | Portion II | |
|---|---|---|---|---|
| | Weight Percent | Parts by Weight | Weight Percent | Parts by Weight |
| Styrene | 2.5 | 50 | 22.5 | 450 |
| Methacrylic Acid | 1.0 | 20 | 9.0 | 180 |
| Ethyl Acrylate | 6.3 | 126 | 56.7 | 1,134 |
| N-Vinyl-2-Pyrrolidone | .2 | 4 | 1.8 | 36 |
| Cumene Hydroperoxide | | 10 | | 40 |
| Solvesso* 150 | | 1,540 | | |

*Solvesso 150 is a 90 percent aromatic petroleum hydrocarbon having a boiling range of 360° F. to 425° F. with 90 percent boiling between 360° F. and 400° F.

The resulting solution is brought to a 55 percent N.V. with additional Solvesso 150 yielding a carboxy-copolymer solution having a viscosity of $Z_3$ to $Z_4$ (Gardner-Holdt) and an acid value of 63.8, and a color between 1 and 2 (Gardner Scale). A film forming solution is prepared from 141.8 parts by weight of this copolymer solution (reduced to 50 percent N.V. with Solvesso 150), 17 parts by weight of Epoxide 190, and 9.09 parts by weight of an isobutylated urea-formaldehyde resin solution (55 percent N.V.), and 1.5 mil films (wet thickness) are drawn down on Bonderite panels. The films when cured at 360° F. for 30 minutes possess a pencil hardness of 2H and pass a conical mandrel bend test as well as an 80 inch pound Gardner impact test.

EXAMPLE 6

Following the procedure for the preparation of the copolymer of Example 1, a carboxy copolymer solution is prepared from the following:

| Material | Portion I | | Portion II | |
|---|---|---|---|---|
| | Weight Percent | Parts by Weight | Weight Percent | Parts by Weight |
| Styrene | 2.5 | 50 | 22.5 | 450 |
| Methacrylic Acid | 1.0 | 20 | 9.0 | 180 |
| Ethyl Acrylate | 6.3 | 126 | 56.7 | 1,134 |
| N-Vinyl-2-Pyrrolidone | .2 | 4 | 1.8 | 36 |
| Cumene Hydroperoxide | | 30 | | 40 |
| Xylene | | 1,500 | | 40 |

The resulting copolymer solution is adjusted to 50 percent N.V. in 81.8 percent xylene and 18.2 percent butanol forming a solution of the copolymer having a viscosity of W to X (Gardner-Holdt). A film forming solution is prepared from 156 parts by weight of this copolymer solution (50 percent N.V.), 17 parts by weight of Epoxide 190, and 6.25 parts by weight of a melamine-formaldehyde resin solution (80 percent N.V.), and 1.5 mil films (wet thickness) are drawn down on iron phosphate coated panels. The films when cured at 360° F. for thirty minutes pass an 80 inch pound Gardner impact test.

EXAMPLE 7

Following the procedure for the preparation of the copolymer of Example 1, a carboxy copolymer solution is prepared from the following:

| Material | Portion I | | Portion II | |
|---|---|---|---|---|
| | Weight Percent | Parts by Weight | Weight Percent | Parts by Weight |
| Styrene | 2.5 | 50 | 22.5 | 450 |
| Methacrylic Acid | 1.0 | 20 | 9.0 | 180 |
| Ethyl Acrylate | 6.3 | 126 | 56.7 | 1,134 |
| N-Vinyl-2-Pyrrolidone | .2 | 4 | 1.8 | 36 |
| Cumene Hydroperoxide | | 10 | | 25 |
| Xylene | | 1,540 | | |

The resulting copolymer solution is adjusted to 50 percent N.V. in 81.8 percent xylene and 18.2 percent butanol, the resulting solution of the copolymer having a viscosity of $Z_1$ to $Z_2$ (Gardner-Holdt), an acid value of 66.6, and a color of less than one (Gardner Scale). A film forming solution is prepared from 156 parts by weight of this copolymer solution (50 percent N.V.), 17 parts by weight of Epoxide 190, and 9.09 parts by weight of an isobutylated urea-formaldehyde resin solution (55 percent N.V.) and 1.5 mil films (wet thickness) are drawn down on iron phosphate coated panels. The films when cured at 360° F. for thirty minutes pass the 80 inch pound Gardner impact test.

EXAMPLE 8

Following the procedure for the preparation of the copolymer of Example 1, a carboxy copolymer solution is prepared from the following:

| Material | Portion I | | Portion II | |
|---|---|---|---|---|
| | Weight Percent | Parts by Weight | Weight Percent | Parts by Weight |
| Styrene | 6.6 | 66 | 26.4 | 264 |
| Methyl Methacrylate | 4.0 | 40 | 16.0 | 160 |
| Butyl Acrylate | 4.0 | 40 | 16.0 | 160 |
| Methacrylic Acid | 2.0 | 20 | 8.0 | 80 |
| N-Vinyl-2-Pyrrolidone | .8 | 8 | 3.2 | 32 |
| Vinyl Acetate | 2.6 | 26 | 10.4 | 104 |
| Cumene Hydroperoxide | | 25 | | 25 |
| Xylene | | 770 | | |

The resulting copolymer solution is adjusted to a 50 percent N.V. solution of the carboxy copolymer by addi-tional xylene producing a solution having a viscosity of $Z_5$ to $Z_6$ (Gardner-Holdt), an acid value of 67.5 and a color between 2 and 3 (Gardner Scale). From a film forming solution of 156 parts by weight of this copolymer solution (50 percent N.V.), 17 parts by weight of Epoxide 150, and 9.09 parts by weight of an isobutylated urea-formaldehyde resin solution (55 percent N.V.) 1.5 mil films (wet thickness) are drawn down on iron phosphate coated panels. The films when cured at 360° F. for thirty minutes possess a pencil hardness of H and pass the conical mandrel bend test. The pencil hardness of the films after forty days in 140° F. grease (50/50 cottonseed oil/oleic acid mixture having an acid value of 100) changes from H to F.

EXAMPLE 9

| Material | Weight Percent | Parts by Weight |
|---|---|---|
| Styrene | 40 | 300 |
| Ethyl Acrylate | 48 | 960 |
| Methacrylic Acid | 10 | 200 |
| N-Vinyl-2-Pyrrolidone | 2 | 40 |
| Cumene Hydroperoxide | | 60 |
| Xylene | | 1,540 |

The xylene is charged into a 5000 ml. round-bottomed, three-necked flask fitted with a mechanical agitator, thermometer, condenser, and dropping funnel and the flask contents are heated to 115° C. The styrene, ethyl acrylate, methacrylic acid, N-vinyl-2-pyrrolidone, and cumene hydroperoxide are combined and agitated until all of the peroxide is in solution. This monomer-catalyst solution is then added by means of the dropping funnel to the hot solvent, with continued stirring, over a period of one hour, maintaining the reaction temperature between 115° C. and 120° C. After all of the monomer-catalyst solution is added, reflux is continued for an additional three hours at a temperature of 126° C., after which the flask contents are cooled to room temperature. The resulting solution is adjusted to 50 percent N.V. in 81.8 percent xylene and 18.2 percent butanol, the resulting solution of the copolymer having a viscosity of W to X (Gardner-Holdt), an acid value of 64 and a color of one (Gardner Scale). From a film forming solution of 156 parts by weight of this copolymer solution (50 percent N.V.), 17 parts by weight of Epoxide 190, and 9.09 parts by weight of an isobutylated urea-formaldehyde resin solution (55 percent N.V.) 1.5 mil films (wet thickness) are drawn down on iron phosphate coated panels. The films when cured at 360° F. for thirty minutes possess a pencil hardness between F and H and pass a 30 inch pound Gardner impact test.

EXAMPLE 10

Following the procedure for the preparation of the copolymer of Example 9, a carboxy copolymer solution is prepared from the following:

| Material | Weight Percent | Parts by Weight |
|---|---|---|
| Styrene | 25 | 500 |
| Methacrylic Acid | 10 | 200 |
| Ethyl Acrylate | 63 | 1,260 |
| N-Vinyl-2-Pyrrolidone | 2 | 40 |
| Di-tertiary butyl hydroperoxide | | 10 |
| Xylene | | 1,540 |

The resulting copolymer solution is adjusted to 45 percent N.V. by the addition of a 60/40 2-ethoxy ethyl acetate/butanol mixture producing a 63.2 percent xylene-21.6 percent 2-ethoxy ethyl acetate-15.2 percent butanol solution of the copolymer having a viscosity of $Z_4$ (Gardner-Holdt), an acid value of 67.2, and a color of less than one (Gardner Scale). From a film forming solution of 168.66 parts by weight of this copolymer solution (45 percent N.V.), 18.1 parts by weight of Epoxide 190, and 10 parts by weight of an isobutylated urea-formaldehyde resin solution (55 percent N.V.) 1.5 mil films (wet thickness) are drawn down on iron phosphate coated panels. The films when cured at 360° F. for thirty minutes pass an 80 inch pound Gardner impact test.

EXAMPLE 11

Following the procedure for the preparation of the copolymer of Example 9, a carboxy copolymer solution is prepared from the following:

| Material | Weight Percent | Parts by Weight |
|---|---|---|
| Styrene | 33.0 | 660 |
| Methyl Methacrylate | 33.0 | 660 |
| Butyl Acrylate | 20.0 | 400 |
| Methacrylic Acid | 10.0 | 200 |
| N-Vinyl-2-Pyrrolidone | 4.0 | 80 |
| Di-tertiary butyl hydroperoxide | | 60 |
| Xylene | | 1,540 |

The resulting solution of the carboxy copolymer is adjusted to a 50 percent N.V. in 81.8 percent xylene and 18.2 percent Solox* producing a solution of the copolymer having a viscosity of Z (Gardner Scale). In accordance with the foregoing examples 156 parts by weight of this copolymer solution (50 percent N.V.), 17 parts by weight Epoxide 190, 9.09 parts by weight of an isobutylated urea-formaldehyde resin solution (55 percent N.V.) are blended and film forming solutions prepared for stability determinations. The stability data appears in Table II.

Among other film forming solutions prepared according to this invention, stability data are given in Table II for the following, the copolymer solution being prepared according to Example 9.

EXAMPLE 12

Copolymer: Weight percent
　Styrene _____ 34
　Methyl methacrylate _____ 34
　Butyl acrylate _____ 20
　Methacrylic acid _____ 10
　N-vinyl-2-pyrrolidone _____ 2
　　　　　　　　　　　　　　　　　　　　　─────
　　　　　　　　　　　　　　　　　　　　　100

Film forming composition: Parts by weight
　Copolymer solution [1] _____ 156
　Epoxide 190 _____ 17
　Urea-formaldehyde [2] _____ 9.09
　　　　　　　　　　　　　　　　　　　　　─────
　　　　　　　　　　　　　　　　　　　　　182.09

EXAMPLE 13

Copolymer: Weight percent
　Styrene _____ 29
　Methyl methacrylate _____ 34
　Ethyl acrylate _____ 25
　Methacrylic acid _____ 10
　N-vinyl-2-pyrrolidone _____ 2
　　　　　　　　　　　　　　　　　　　　　─────
　　　　　　　　　　　　　　　　　　　　　100

Film forming composition: Parts by weight
　Copolymer solution [1] _____ 156
　Epoxide 190 _____ 17
　Urea-formaldehyde [2] _____ 9.09
　　　　　　　　　　　　　　　　　　　　　─────
　　　　　　　　　　　　　　　　　　　　　182.09

EXAMPLE 14

Copolymer: Weight percent
　Styrene _____ 33
　Methyl methacrylate _____ 33
　Butyl acrylate _____ 20
　Di-butyl fumarate _____ 10
　N-vinyl-2-pyrrolidone _____ 4
　　　　　　　　　　　　　　　　　　　　　─────
　　　　　　　　　　　　　　　　　　　　　100

*Solox is a denatured ethyl alcohol (100 parts ethanol, 5 parts ethyl acetate, one part gasoline).

Film forming composition: Parts by weight
　Copolymer solution [1] _____ 156
　Epoxide 190 _____ 17
　Urea-formaldehyde [2] _____ 9.09
　　　　　　　　　　　　　　　　　　　　　─────
　　　　　　　　　　　　　　　　　　　　　182.09

EXAMPLE 15

Copolymer: Weight percent
　Vinyl toluene _____ 15
　Methyl methacrylate _____ 33
　Butyl acrylate _____ 40
　Methacrylic acid _____ 10
　N-vinyl-2-pyrrolidone _____ 2
　　　　　　　　　　　　　　　　　　　　　─────
　　　　　　　　　　　　　　　　　　　　　100

Film forming composition: Parts by weight
　Copolymer solution [1] _____ 156
　Epoixde 190 _____ 17
　Urea-formaldehyde [2] _____ 9.09
　　　　　　　　　　　　　　　　　　　　　─────
　　　　　　　　　　　　　　　　　　　　　182.09

EXAMPLE 16

Copolymer: Weight percent
　Styrene _____ 34
　Methyl methacrylate _____ 34
　Butyl acrylate _____ 20
　Methacrylic acid _____ 10
　N-vinyl-2-pyrrolidone _____ 2
　　　　　　　　　　　　　　　　　　　　　─────
　　　　　　　　　　　　　　　　　　　　　100

Film forming composition: Parts by weight
　Copolymer solution [1] _____ 156
　Epoxide 190 _____ 17
　Urea-formaldehyde [2] _____ 9.09
　　　　　　　　　　　　　　　　　　　　　─────
　　　　　　　　　　　　　　　　　　　　　182.09

EXAMPLE 17

Copolymer: Weight percent
　Styrene _____ 35
　Methyl methacrylate _____ 53
　Methacrylic acid _____ 10
　N-vinyl-2-pyrrolidone _____ 2
　　　　　　　　　　　　　　　　　　　　　─────
　　　　　　　　　　　　　　　　　　　　　100

Film forming composition: Parts by weight
　Copolymer solution (at 46 percent nonvolatiles) _____ 156
　Epoxide 190 _____ 17
　Urea-formaldehyde [2] _____ 9.09
　　　　　　　　　　　　　　　　　　　　　─────
　　　　　　　　　　　　　　　　　　　　　182.09

EXAMPLE 18

Copolymer: Weight percent
　Styrene _____ 35
　Methyl methacrylate _____ 53
　Methacrylic acid _____ 10
　N-vinyl-2-pyrrolidone _____ 2
　　　　　　　　　　　　　　　　　　　　　─────
　　　　　　　　　　　　　　　　　　　　　100

Film forming composition: Parts by weight
　Copolymer solution [1] _____ 156
　Epoxide 190 _____ 17
　Urea-formaldehyde [2] _____ 9.09
　　　　　　　　　　　　　　　　　　　　　─────
　　　　　　　　　　　　　　　　　　　　　182.09

[1] Copolymer solution adjusted to 50 percent non-volatiles with n-butanol.
[2] Urea-formaldehyde is an isobutylated urea-formaldehyde resin solution (55 percent non-volatiles).

Table II

| Composition | Stability Data | | | |
|---|---|---|---|---|
| | Time | Temperature | Initial Viscosity | Final Viscosity |
| Vinyl pyrrolidone copolymer-Epoxide 190-Isobutylated UF. Film forming composition of Example 11. | 30 days | 140° F | U-V | $Z_2$-$Z_3$. |
| Vinyl pyrrolidone copolymer-Epoxide 190-Isobutylated UF. Film forming composition of Example 12. | do | 140° F | X-Y | $Z_4$-$Z_5$. |
| Vinyl pyrrolidone copolymer-Epoxide 190-Isobutylated UF. Film forming composition of Example 13. | 21 days | 140° F | $Z_1$-$Z_2$ | $Z_4$-$Z_5$. |
| Vinyl pyrrolidone copolymer-Epoxide 190-Isobutylated UF. Film forming composition of Example 14. | 60 days | 140° F | S-T | $Z_4$-$Z_5$. |
| Vinyl pyrrolidone copolymer-Epoxide 190-Isobutylated UF. Film forming composition of Example 15. | 70 days | 125° F | L-M | Z. |
| Vinyl pyrrolidone copolymer-Epoxide 190-Isobutylated UF. Film forming composition of Example 16. | 30 days | 140° F | X | $Z_4$-$Z_5$. |
| Vinyl pyrrolidone copolymer-Epoxide 190-Isobutylated UF. Film forming composition of Example 17. | do | 140° F | $Z_3$ | $Z_5$-$Z_6$. |
| Vinyl pyrrolidone copolymer-Epoxide 190-Isobutylated UF. Film forming composition of Example 18. | do | 140° F | Z | $Z_4$-$Z_5$. |
| Vinyl pyrrolidone copolymer-Epoxide 190-Isobutylated UF. Film forming composition of Example 1. | 5 months | Room temp | $Z_1$-$Z_2$ | $Z_3$-$Z_4$. |
| Vinyl pyrrolidone copolymer-Epoxide 250-Isobutylated UF. Film forming composition of Example 1. | do | do | $Z_2$ | $Z_4$-$Z_5$. |
| Vinyl pyrrolidone copolymer-Epoxide 475-Isobutylated UF. Film forming composition of Example 1. | do | do | $Z_2$-$Z_3$ | $Z_3$-$Z_4$. |
| Vinyl pyrrolidone copolymer-Epoxide 590-Isobutylated UF. Film forming composition of Example 1. | do | do | $Z_2$-$Z_3$ | $Z_2$-$Z_3$. |
| Vinyl pyrrolidone copolymer-Epoxide 475-Triazine formaldehyde. Film forming composition of Example 2. | do | do | $Z_2$ | $Z_4$-$Z_5$. |
| Vinyl pyrrolidone copolymer-Epoxide 590-Triazine formaldehyde. Film forming composition of Example 2. | do | do | $Z_2$ | $Z_4$-$Z_5$. |
| No vinyl pyrrolidone in copolymer-Epoxide 190-Isobutylated UF. Composition contained 1 percent BTMACL as in Example 4. | 4 days | do | | Gelled. |
| | 24 hours | 125° F | | Gelled. |
| Vinyl pyridine in copolymer-Epoxide 190-No Isobutylated UF. Film forming composition of Example 19. | do | Room temp | | Gelled. |

UF = Isobutylated urea-formaldehyde resin.
BTMACL = Benzyl trimethyl ammonium chloride.

EXAMPLE 19

Following the procedure for the preparation of the copolymer of Example 1, a carboxy copolymer solution is prepared using vinyl pyridine instead of vinyl pyrrolidone as follows:

| Material | Portion I | | Portion II | |
|---|---|---|---|---|
| | Weight Percent | Parts by Weight | Weight Percent | Parts by Weight |
| Styrene | 6.91 | 138 | 27.13 | 543 |
| Methyl Methacrylate | 6.91 | 138 | 27.13 | 543 |
| Butyl Acrylate | 4.18 | 84 | 16.74 | 335 |
| Methacrylic Acid | 2.00 | 40 | 8.00 | 160 |
| Vinyl Pyridine | | | 1.00 | 20 |
| Cumene Hydroperoxide | | 30 | | 40 |
| Xylene | | 1,540 | | |

The resulting copolymer solution is adjusted to a 50 N.V. solution in 81.8 percent xylene and 18.2 percent butanol producing a solution of the copolymer having a viscosity of $Z_2$ (Gardner-Holdt), an acid value of 61.7 and a color between 4 and 5 (Gardner Scale). From a copolymer solution of 164.2 parts by weight of this copolymer solution (50 percent N.V.), and 17.9 parts by weight of Epoxide 190, 1.5 mil films (wet thickness) are drawn down on iron phosphate coated panels. The films when cured at 300° F. for thirty minutes possess a pencil hardness of 3H. The stability of the film forming solution is given in Table II.

EXAMPLE 20

Following Example 1 and using the copolymer of that example, films are prepared using the following epoxides instead of Epoxide 190: diglycidyl ether of trimethylol propane, dicyclopentadiene diepoxide, 3,4-epoxy-6-methyl-cyclohexylmethyl-3-4-epoxy-6-methyl-cyclohexanecarboxylate, and bis-epoxydicyclopentyl ether of ethylene glycol. These films are slightly more brittle than films resulting from Example 1, and in addition in the case of bis-epoxydicyclopentyl ether of ethylene glycol it is necessary to use a stronger solvent instead of xylene, methyl isobutyl ketone having been used in this example.

EXAMPLE 21

A mixture of 30.0 parts by weight of rutile titanium dioxide, 3.0 parts by weight of the 50 percent copolymer solution of Example 1, 5.63 parts by weight of Solvesso 100[1], and 0.03 part by weight of butyl alcohol is ground in a pebble mill for a period of eighteen hours. At the end of this period an additional 6.0 parts by weight of the copolymer solution of Example 1 are added and the grinding is continued for two more hours. At the end of this two hour period the binder is added to the pebble mill ground mixture, the binder being a mixture made up of 37.60 parts by weight of the copolymer solution of Example 1, 2.73 parts by weight of a 50 percent N.V. isobutylated urea-formaldehyde resin in a 60/40 butanol/xylol solvent, 5.10 parts by weight of diglycidyl ether of bisphenol prepared by the condensation of 10 mol of epichlorhydrin with one mol of bisphenol (Epoxide 196), 1.00 part by weight of a 15 percent Polymekon wax[2] dispersion in n-butyl alcohol, 4.5 parts by weight of octyl alcohol, 2.65 parts by weight of Solvesso 100, and 1.76 parts by weight of butyl alcohol. Films prepared by spraying the resulting pigmented film forming solution onto iron phosphate coated steel panels to form 1.5–1.8 mil films are cured by baking at 350° F. for thirty minutes. To show how the resulting pigmented films of this invention compare with commercial appliance finishes, Table III is given wherein the pigmented coating of this example is compared with two well known appliance enamels. One is a pigmented styrene, ethyl acrylate, acrylamide copolymer in combination with a bisphenol-epichlorhydrin polyepoxide having a molecular weight of about 900 (hereinafter termed "Commercial Acrylate"), and the other is a conventional alkyd appliance enamel.

As indicated hereinbefore, prior art carboxy copolymer-epoxy compositions, due to their instability, have not found wide commercial acceptance. Accordingly to illustrate the commercial importance of the composition of this invention it is compared with two outstanding appliance enamels. These two enamels are two of the best on the market, yet as shown in the table the enamel of the invention is as good as these finishes, and, in fact, better in resistance properties such as grease and detergent resistance.

The two coat system is given in the table to show the improvement obtained by using the composition of this

---

[1] Solvesso 100 is a 95 percent aromatic petroleum hydrocarbon having a boiling range of 315° F. to 355° F. with 90 percent boiling between 315° F. and 338° F.
[2] Polymekon wax is a 100 percent micro-crystalline petroleum wax.

Table III

| Enamel Constants | Example 21 | | Commercial Acrylate | | Conventional Alkyd Appliance Enamel | |
|---|---|---|---|---|---|---|
| Viscosity No. 4 F.C. at 77° F | 75–85 seconds | | 75–85 seconds | | 60–70 seconds. | |
| Wt. per Gallon | 10.5–10.5 | | 10.1 | | 10.0–10.2. | |
| Reduction for Hand Spray | 4–1 with Xylol | | 4.1 with Xylol | | 4–1 with Xylol. | |
| Condition: | | | | | | |
| Metal Preparation | 20 Ga. Steel-Bond. 1000 | | 20 Ga. Steel-Bond. 1000 | | 20 Ga. Steel-Bond. 1000. | |
| Baking Schedule | 30′ at 360° F | | 30′ at 350° F | | 30′ at 300° F. | |
| Dry Film Thickness | 1.4–1.6 Mils | | 1.8–2.0 Mils | | 1.8–2.0 Mils. | |
| Test: | | | | | | |
| Gloss, Photovolt | 85–90 | | 80–85 | | 85–90. | |
| Flexibility, Conical Mandrel | Fine Cracking for 2 inches from Small End | 7 | Fine Cracking for 1⅝ inch from End | 8 | Fine Cracking for ½–1 inch from Small End | 9 |
| Hardness, Pencil Method | 3H–4H | 10 | 3H–4H | 10 | F–H | 7 |
| Adhesion, Knife Scratch | Excellent | 10 | Excellent | 10 | V. Good | 9 |
| Impact, Gardner Impact Tester: | | | | | | |
| 20 in./lb.: | | | | | | |
| Convex | Fine Radial Cracks | 8 | Fine Radial Cracks | 8 | Fine Radial Cracks | 8 |
| Concave | No Cracking | 10 | No Cracking | 10 | No Cracking | 10 |
| 28 in./lb.: | | | | | | |
| Convex | Fine Radial Cracks | 8 | Fine Radial Cracks | 8 | Fine Radial Cracks | 8 |
| Concave | No Cracking | 10 | No Cracking | 10 | No Cracking | 10 |
| 35 in./lb.: | | | | | | |
| Convex | Fine Radial Cracks | 8 | Fine Radial Cracks | 8 | Fine Radial Cracks | 8 |
| Concave | No Cracking | 10 | No Cracking | 10 | No Cracking | 10 |
| Grease, 1 Month Immersion at RT in 50 percent Oleic Acid, 50 percent Cottonseed Oil. | *No Change, Remains | | Changes from 3H to F | | Changes from F to 3B. | |
| Stains, 48 Hrs.: | | | | | | |
| Lipstick | *No Stain | 10 | V. Sl. Staining | 9 | Stain | 4 |
| Orange Dye | No Stain | 10 | No Stain | 10 | Stain | 4 |
| Clorox | V. Sl. Yellowing | 9 | Slight Yellowing | 8 | V. Sl. Etch | 8 |
| 5 percent NaOH | No Stain | 10 | No Stain | 10 | Film Removal | 0 |
| Vinegar | No Stain | 10 | No Stain | 10 | No Failure | 10 |
| Mustard | No Stain | 10 | Slight Staining | 8 | Stain | 4 |
| Water Soak, 1,000 Hrs., 120° F | No Change | 10 | No Change | 10 | Isolated Pinpoint | 9 |
| Humidity, 1,000 Hrs., 100 percent Humidity, 100° F. | No Change | 10 | No Change | 10 | No Change | 10 |
| Salt Spray, 1,000 Hrs., 20 percent NaCl Conc. 95° F. | ½₂″ Creepage | 9 | ½₂″–⅟₁₆″ Creepage | 8 | ½″–¾″ Creepage. Considerable Rusting | 3 |
| Detergent: | | | | | | |
| Tide, 1 percent, 160° F., 250 Hrs. | *Scattered isolated Small Pinhead Size Pimples | 8 | Small to Medium Blisters Over 75 percent of Area | 3 | Complete Failure in 100 Hrs | 0 |
| Surf, 2 percent at 160° F., 120 Hrs. | 4 Pinpoint Pimples | 9 | Scattered Pinhead | 7 | Complete Failure | 0 |
| Adhesion After | Excellent | | Poor | | Failed. | |
| Overbake, 100 percent at Baking Temp. | V. Sl. Yellowing | 9 | V. Sl. Yellowing | 9 | V. Sl. Yellowing | 9 |
| Mar, Fingernail | Excellent | 10 | Excellent | 10 | Excellent | 10 |
| Accelerated Weathering, 1,000 Hours. | V. Good, Sl. Water Spotting, V. Sl. Yellowing | 9 | V. Good, Sl. Water Spotting, Sl. Dulling, V. Sl. Yellowing | 8 | Good, Sl. Water Spotting, Dulling, Yellowing | 6 |
| Recoatability | Excellent | 10 | V. Good | 9 | Good | 8 |

2 COAT SYSTEM, LOW BAKE

| Conditions | Alkyd Primer Topcoat Example 21 | | Conventional Epoxy Ester Primer with Alkyd Amino Enamel | |
|---|---|---|---|---|
| Metal Preparation | 20 Ga. Steel, Bonderite No. 1000 | | 20 Ga. Steel, Bonderite No. 1000. | |
| Baking Schedule: | | | | |
| Primer | 35′ at 325° F | | 35′ at 365° F. | |
| Enamel | 30′ at 325° F | | 40′ at 295° F. | |
| Film Thickness: | | | | |
| Primer | .7–.9 Sprayed | | .7–.9 Sprayed. | |
| Enamel | 1.0–1.2 | | 1.0–1.2. | |
| Av. Total | 1.8–2.0 | | 1.8–2.0. | |
| Test: | | | | |
| Gloss, Photovolt 60° Glossmeter | 90 | | 80 | |
| Flexibility, Conical Mandrel | Fine Hairline Cracks for 4″, No Flaking | 6 | Fine Hairline Cracking for 1″, No Flaking | 9 |
| Hardness, Pencil Method | 2H | | 2H–H. | |
| Adhesion, Knife Test | Excellent | 10 | Excellent | 10 |
| Intercoat Adhesion, Knife Scratch | Excellent | 10 | Excellent | 10 |
| Impact (Gardner Impact Tester): | | | | |
| 20 in./lb.: | | | | |
| Convex | Fine Cracking, No Flaking | 8 | Fine Cracking, No Flaking | 8 |
| Concave | No Cracking | 10 | No Cracking | 10 |
| 26 in./lb.: | | | | |
| Convex | Fine Cracking, No Flaking | 7 | Fine Cracking, No Flaking | 7 |
| Concave | V. Sl. Concentric Cracking | 8 | No Cracking | 10 |
| 35 in./lb.: | | | | |
| Convex | Fine Cracking, No Flaking | 7 | Fine Cracking, No Flaking | 7 |
| Concave | F. Sl. Concentric Cracking | 8 | No Cracking | 10 |
| Grease, 1 Month Immersion, Cottonseed Oil/Oleic Acid, Room Temp. | Softened 2H to F | 8 | Softened 2H to HB | 7 |
| Stains 48 Hrs.: | | | | |
| Lipstick | *No Stain | 10 | Definite Stain | 5 |
| Orange Dye | No Stain | 10 | Definite Stain | 5 |
| Clorox | V. Sl. Stain | 9 | No Stain | 10 |
| 5 percent NaOH | No Stain | 10 | Sl. Etching | 8 |
| Vinegar | No Stain | 10 | No Stain | 10 |
| Mustard | No Stain | 10 | Definite Stain | 6 |
| Water Soak, 1,000 Hrs. at 120° F | Isolated Pinpoint Pimples | 9 | No Change | 10 |
| Humidity, 800 Hrs., 100 percent Humidity, 100° F. | No Change | 10 | No Change | 10 |
| Salt Spray, 800 Hrs., 20 percent NaCl, 95° F | ⅟₁₆″ Creepage | 9 | ³⁄₁₆″–¼″ Creepage | 6 |
| Overbake, 100 percent at Enamel Baking Temp. | V. Slight Yellowing | 9 | V. Sl. Yellowing | 9 |
| Mar, Fingernail | Fair to Good | 9 | Excellent | 10 |
| Recoatability | Excellent | 10 | V. Good | 9 |
| Touch-Up | V. Good | 9 | V. Good | 9 |

*Particularly outstanding.

invention with a poor primer. An epoxy ester when pigmented produces an excellent primer. The use of this primer with a very good topcoat yields an excellent two coat system. An alkyd, however, yields on pigmentation a relatively poor primer. Yet when this primer is used with the composition of this invention as a topcoat a two coat finish results which is as good as one of the best two coat systems and even better in stain resistance.

A composition prepared according to Example 21, but without the isobutylated urea-formaldehyde resin, compares favorably with the commercial acrylate, being better than the conventional alkyd appliance enamel but not quite as good as the composition of Example 21.

EXAMPLE 22

Following the procedure for the preparation of the copolymer of Example 9, a carboxy copolymer solution is prepared from the following:

| Material | Weight Percent | Parts by Weight |
| --- | --- | --- |
| Styrene | 34.0 | 680 |
| Methyl Methacrylate | 34.0 | 680 |
| Butyl Acrylate | 20.0 | 400 |
| Methacrylic Acid | 10.0 | 200 |
| N-Vinyl-2-Pyrrolidone | 2.0 | 40 |
| Di-tertiary butyl hydroperoxide | | 60 |
| Xylene | | 1,540 |

The resulting copolymer solution of the carboxy copolymer is adjusted to a 50 percent N.V. solution in 81.8 percent xylene and 18.2 percent butanol producing a solution of the copolymer having a viscosity of $Z_3$ (Gardner-Holdt), an acid value of 61.8 and a color of less than one (Gardner Scale). In following Example 21 and substituting 46.60 parts of this copolymer solution for the 46.60 parts of copolymer solution used in Example 21, a pigmented film forming composition is made and 1.5–1.8 mil films sprayed and cured at 350° F. as in Example 21.

EXAMPLE 23

The copolymer solution of Example 11 is similar to the copolymer solution of Example 22, but it contains twice as much N-vinyl pyrrolidone as the one in Example 22. A third pigmented film forming composition is prepared by substituting 46.60 parts of the copolymer of Example 11 for the 46.60 parts of copolymer solution used in Example 21. Films of this film forming composition are l so sprayed and cured as in Example 21.

EXAMPLE 24

Following the procedure for the preparation of the copolymer of Example 9, a carboxy copolymer solution is prepared without vinyl pyrrolidone from the following:

| Material | Weight Percent | Parts by Weight |
| --- | --- | --- |
| Styrene | 35.0 | 700 |
| Methyl Methacrylate | 35.0 | 700 |
| Butyl Acrylate | 20.0 | 400 |
| Methacrylic Acid | 10.0 | 200 |
| Di-tertiary butyl hydroperoxide | | 30 |
| Xylene | | 1,540 |

The resulting copolymer solution is adjusted to a 50 percent N.V. solution of the carboxy copolymer by additional xylene producing a solution having a viscosity of X to Y (Gardner-Holdt), an acid value of 63.4, and a color of less than one (Gardner Scale). In accordance with Example 21 a pigmented film forming composition is also prepared by substituting 46.60 parts of this copolymer solution for the 46.60 parts of copolymer solution used in Example 21. Films are also prepared as described in Example 21.

Flexibility of the pigmented films prepared from the three paints of Examples 22, 23 and 24 is determined by bending on a conical mandrel and the adhesion of the films to metal is determined by scratching the film with a knife, the results of these tests appearing in Table IV.

*Table IV*

| Description of Film | Conical Mandrel | (Knife Scratch) |
| --- | --- | --- |
| Copolymer-Epoxide-Isobutylated Urea-formaldehyde film. Pigmentation formulation is the same in each case (as Example 21). Only difference is in copolymer. | | Adhesion to Metal. |
| Copolymer contains no VP. (Film of Example 24.) | Showed cracking the width of the panel and flaking at small end. | Less adhesion than films of either Example 22 or Example 23. |
| Copolymer contains 2 percent VP. (Film of Example 22.) | Showed fine cracks from the small end of the bend out 2 inches. There were scattered disconnected cracks on the remainder of the panel. | Better adhesion than film of Example 24, less adhesion than film of Example 23. |
| Copolymer contains 4 percent VP. (Film of Example 23.) | Showed fine cracks from the small end of the bend out 1½ inches. | Showed better adhesion than films of Examples 22 and 24. |

The foregoing examples not only demonstrate the remarkably superior stability of the film-forming compositions of this invention when compared with those containing catalysts or vinyl pyridine, but they also illustrate that outstanding properties are obtainable in accordance with this invention in both clear and pigmented films. Films made from the stable compositions of the invention are as good in all respects, and superior in many respects, to conventional appliance finishes. The films can be made with or without the aldehyde condensate depending upon desired curing temperature and properties. Other variations will also occur to one skilled in the art, and such variations are deemed to be within the scope of this invention.

What is claimed is:
1. A heat-convertible, solvent thinned, room temperature stable, resinous composition of matter comprising, in solution, a polyepoxide and a carboxy copolymer, combined in a ratio of 0.7 to 2 equivalents polyepoxide to 1 equivalent of a carboxy copolymer, said polyepoxide being selected from the group consisting of glycidyl polyethers of polyhydric alcohols, glycidyl polyethers of polyhydric phenols, dicyclopentadiene diepoxide, bis-epoxydicyclopentyl ether of ethylene glycol, and 3,4-epoxy-6- methylcyclohexylmethyl-3,4-epoxy - 6 - methylcyclohexanecarboxylate, said carboxy copolymer being a copolymer of 5 to 25 weight percent of a short chain alpha-beta monounsaturated monocarboxylic acid having not more than four carbon atoms, 1 to 5 weight percent N-vinyl pyrrolidone and a different monoethylenically unsaturated monomer copolymerizable therewith, the total being 100 percent, said solvent thinned composition being devoid of added catalyst because of the presence of N-vinyl pyrrolidone.

2. The composition of claim 1 wherein the alpha-beta unsaturated acid is selected from the group consisting of acrylic and methacrylic acids, the ethylenically unsaturated monomer copolymerizable with the acid and N-vinyl pyrrolidone includes styrene, methyl methacrylate and butyl acrylate, and the polyepoxide is a glycidyl polyether of a dihydric phenol having a 1,2-epoxy equivalency greater than one and an epoxide equivalent not exceeding 900.

3. The coating composition of claim 1 containing an amine aldehyde resin selected from the group consisting of alkylated aldehyde-amino triazine condensates and alkylated aldehyde-amino amide condensates, the amount of aldehyde condensate being 5 to 40 weight percent of the carboxy copolymer-polyepoxide-aldehyde condensate composition.

4. A coating composition adapted for being heat hardened into an infusible, solvent insoluble, grease and alkali resistant film, said composition comprising:
(1) a polyepoxide selected from the group consisting of glycidyl polyethers of polyhydric alcohols, glycidyl polyethers of polyhydric phenols, dicyclopentadiene diepoxide, bis-expoxy-dicyclopentyl ether of ethylene glycol, and 3,4-epoxy-6-methylcyclohexylmethyl-3,4-epoxy-6-methylcyclohexanecarboxylate,
(2) a carboxy copolymer of
(a) 5 to 25 weight percent of a short chain alpha-beta monounsaturated monocarboxylic acid having not more than four carbon atoms,
(b) from 1 to less than 20 weight percent N-vinyl pyrrolidone, said vinyl pyrrolidone functioning as the only catalyst in the composition, and
(c) a different monoethylenically unsaturated monomer copolymerizable with (a) and (b), the total of (a), (b) and (c) being 100 percent,
(3) sufficient non-aqueous solvent to give the desired consistency to the composition,
the ratio of (1) to (2) being 0.7 to 2 equivalents of (1) to 1 equivalent of (2).

5. In the process for the preparation of thermoset, infusible solvent insoluble compositions wherein 0.7 to 2 equivalents of a polyepoxide and one equivalent of a carboxy copolymer are heat reacted in the presence of an organic basic catalyst, the improvement which comprises eliminating the organic basic catalyst by the use of an N-vinyl pyrrolidone-containing carboxy copolymer of 5 to 25 weight percent of a short chain alpha-beta monounsaturated monocarboxylic acid having not more than four carbon atoms, 1 to 20 percent N-vinyl pyrrolidone and a different monoethylenically unsaturated monomer copolymerizable therewith, the total carboxy copolymer monomer composition being 100 percent, the polyepoxide being selected from the group consisting of glycidyl polyethers of polyhydric alcohols, glycidyl polyethers of polyhydric phenols, dicyclopentadiene diepoxide, bisepoxy-dicyclopentyl ether of ethylene glycol, and 3,4-epoxy-6-methylcyclohexylmethyl-3,4-epoxy - 6 - methylcyclohexanecarboxylate.

References Cited in the file of this patent
UNITED STATES PATENTS

| | | |
|---|---|---|
| 2,604,464 | Segall et al. | July 22, 1952 |
| 2,798,861 | Segall et al. | July 9, 1957 |
| 2,897,174 | Chapin et al. | July 28, 1959 |
| 2,910,459 | Rothrock et al. | Oct. 27, 1959 |
| 2,918,391 | Hornibrook | Dec. 22, 1959 |
| 2,941,980 | Robinson | June 21, 1960 |
| 2,964,492 | Murdock et al. | Dec. 13, 1960 |

OTHER REFERENCES

Wilkinson et al.: "PVP in Pressurized Products," General Aniline and Film Corporation (1954), p. 1–11 (pages 9 and 10 relied upon).